US008743185B2

(12) United States Patent
Yamaguchi et al.

(10) Patent No.: US 8,743,185 B2

(45) Date of Patent: Jun. 3, 2014

(54) STEREOSCOPIC IMAGING OPTICAL SYSTEM, IMAGING DEVICE, AND CAMERA

(75) Inventors: Shinji Yamaguchi, Osaka (JP); Michihiro Yamagata, Osaka (JP); Keiki Yoshitsugu, Hyogo (JP)

(73) Assignee: Panasonic Corporation, Kadoma-shi (JP)

( * ) Notice: Subject to any disclaimer, the term of this patent is extended or adjusted under 35 U.S.C. 154(b) by 401 days.

(21) Appl. No.: 13/287,132

(22) Filed: Nov. 2, 2011

(65) Prior Publication Data

US 2012/0113233 A1 May 10, 2012

(30) Foreign Application Priority Data

Nov. 4, 2010 (JP) ................................ 2010-247066
Aug. 8, 2011 (JP) ................................ 2011-173419

(51) Int. Cl.
*G02B 21/22* (2006.01)

(52) U.S. Cl.
USPC ............. 348/49; 348/369; 359/376; 359/378; 359/464; 359/466

(58) Field of Classification Search
CPC ............ H04N 13/021; H04N 13/0409; H04N 5/2254; G02B 21/22
USPC ............. 348/49, 369; 359/376, 378, 464, 466
See application file for complete search history.

(56) References Cited

U.S. PATENT DOCUMENTS 3,712,199 A * 1/1973 Songer, Jr. .................... 396/324
5,689,365 A * 11/1997 Takahashi ..................... 359/362
6,233,003 B1 * 5/2001 Ono ................................ 348/47
6,383,131 B1 * 5/2002 Yamamoto et al. ........... 600/111
6,747,686 B1 * 6/2004 Bennett ......................... 348/145
2006/0181767 A1 * 8/2006 Hanzawa ...................... 359/380
2009/0123144 A1 * 5/2009 Maezono ...................... 396/327

FOREIGN PATENT DOCUMENTS

JP S54-109432 A 8/1979
JP H08-082766 A 3/1996
JP H10-042314 A 2/1998
JP 2001-075011 A 3/2001
JP 2006-208407 A 8/2006
JP 2009-048181 A 3/2009
JP 2009-210957 A 9/2009

OTHER PUBLICATIONS

Geniet, An overview of rules around making stereo pictures (No. 30), May 18, 2005.*

* cited by examiner

*Primary Examiner* — Joseph Ustaris
*Assistant Examiner* — Maryam Nasri
(74) *Attorney, Agent, or Firm* — Judge Patent Associates

(57) ABSTRACT

A stereoscopic imaging optical system having a function to adjust a stereo base, an imaging device that includes the stereoscopic imaging optical system, and a camera that includes the imaging device, are provided. The stereoscopic imaging optical system includes two imaging lens systems arranged in parallel, and two diaphragms arranged in the imaging lens systems, respectively. At least one of the diaphragms is decentered with respect to an optical axis to adjust the stereo base. Further, a condition ($1.8 \le SB_{max}/(fT \times \tan(\omega T)) \le 45$, where $SB_{max}$ is a maximum value of the stereo base, fT is a focal length of the optical system at a telephoto limit, and ωT is a half view angle (°) at the telephoto limit) is satisfied.

10 Claims, 7 Drawing Sheets

100
206R
207R
101R
205R
204
203
101L
201
207L
205L
202
206L 301
303
302
207
(a)
(b)
(c)
(d)

STEREOSCOPIC IMAGING OPTICAL SYSTEM, IMAGING DEVICE, AND CAMERA

CROSS REFERENCE TO RELATED APPLICATION

The disclosures of Japanese Patent Application No. 2010-247066, filed on Nov. 4, 2010, and Japanese Patent Application No. 2011-173419, filed on Aug. 8, 2011, are incorporated herein by reference.

BACKGROUND OF THE INVENTION

1. Field of the Invention

The present invention relates to a stereoscopic imaging optical system, an imaging device, and a camera, and in particular, relates to a stereo base variable type stereoscopic imaging optical system that includes two imaging lens systems, and an imaging device and a camera that include the stereoscopic imaging optical system.

2. Description of the Background Art

With recent increase in 3D television and movie contents, environments in which general users can easily view 3D (stereoscopic) video images have been being established. Along with this, with regard to imaging devices, cameras capable of taking 3D images have been proposed.

A 3D image can be taken with a pair of optical systems that are provided for forming images for a right eye and a left eye and that are arranged at an appropriate interval (stereo base). In addition, it is known that even with a light beam that passes through a single lens, an image formed by a light beam that passes through a right side of a pupil surface and an image formed by a light beam that passes through a left side of the pupil surface are individually obtained to generate a 3D image corresponding to right and left eyes.

Japanese Laid-Open Patent Publication No. 54-109432 discloses a method in which a color filter having different transparent wavelengths in right and left portions thereof is disposed on a pupil surface and an image is obtained.

Japanese Laid-Open Patent Publication No. 10-42314 discloses a method in which a right side image and a left side image are taken with a single lens at different timings.

Japanese Laid-Open Patent Publication No. 2006-208407 discloses a method in which a light beam divided at a pupil surface is guided by a relay optical system to an image sensor.

Japanese Laid-Open Patent Publication No. 2009-48181 discloses a camera in which an entire optical unit is moved by a detaching/attaching mechanism to adjust a stereo base.

Japanese Laid-Open Patent Publication No. 2009-210957 discloses a camera in which an entire optical unit is moved by a moving mechanism to adjust a stereo base.

Japanese Patent No. 3580869 discloses a method in which a diaphragm is moved in an optical axis direction in an endoscope to adjust a stereoscopic effect.

However, the technology disclosed in Japanese Laid-Open Patent Publication No. 54-109432 uses the color filter, and thus is not suitable for taking a color image. In the technology disclosed in Japanese Laid-Open Patent Publication No. 10-42314, time-division imaging is performed. Thus, an image of a moving object cannot be taken, and the imaging conditions are limited. In the technology disclosed in Japanese Laid-Open Patent Publication No. 2006-208407, the relay optical system is used. Thus, when the technology is applied to a so-called compact camera that generally takes snapshots and the like, the camera is made large in size. In each of the methods in these publications, the stereo base is short. Thus, when each method is applied to taking a snapshot of a person, it is difficult to obtain a sufficient stereoscopic effect. In the technology disclosed in Japanese Laid-Open Patent Publication No. 2009-48181, a stereo base value is selected only from discrete values. In the technology disclosed in Japanese Laid-Open Patent Publication No. 2009-210957, the minimum value of the stereo base is limited by the size of an outer frame of a barrel and thus is not sufficient for a need of taking an image of a close object. In the technology disclosed in Japanese Patent No. 3580869, it is possible to adjust the stereoscopic effect. In the method disclosed in this publication, a so-called convergence point is adjusted to move the reproduced position of an observed image forward or backward, and a sense of depth of a reproduced image cannot be adjusted by adjustment of the stereo base. In addition, the technology disclosed in Japanese Patent No. 3580869 provides design conditions suitable for an endoscope, and an optical system suitable for a compact camera cannot be obtained from the conditions disclosed in this publication.

SUMMARY OF THE INVENTION

The present invention is made in view of the problems described above, and objects of the present invention are to provide a stereoscopic imaging optical system having a function of adjusting a stereo base, an imaging device that includes the stereoscopic imaging optical system, and a camera that includes the imaging device.

One of the above objects is achieved by the following imaging optical system. The stereoscopic imaging optical system according to the present invention is a stereoscopic imaging optical system that forms optical images of an object and that is available for taking a stereoscopic image. The stereoscopic imaging optical system includes: two imaging lens systems arranged in parallel; and two diaphragms arranged in the two imaging lens systems, respectively. At least one of the diaphragms is decentered with respect to an optical axis to adjust a stereo base. Further, the following condition (1) is satisfied.

$$1.8 \leq SB_{max}/(fT \times \tan(\omega T)) \leq 45 \quad (1)$$

where $SB_{max}$ is a maximum value of the stereo base, fT is a focal length of the optical system at a telephoto limit, and ωT is a half view angle (°) at the telephoto limit.

One of the above objects is achieved by the following imaging device. The imaging device according to the present invention is an imaging device capable of outputting an optical image of an object as an electrical image signal. The imaging device includes: the above stereoscopic imaging optical system for forming optical images of an object; and an image sensor for converting the optical images formed by the stereoscopic imaging optical system into electrical image signals.

One of the above objects is achieved by the following camera. The camera according to the present invention is a camera for converting an optical image of an object into an electrical image signal and at least displaying or storing the converted image signal. The camera includes an imaging device that includes: the above stereoscopic imaging optical system for forming optical images of an object; and an image sensor for converting the optical images formed by the stereoscopic imaging optical system into electrical image signals.

According to the present invention, a twin-lens optical system in which a stereo base is variable and which is suitable for a camera can be configured. In addition, a camera that includes the optical system can change the stereo base in accordance with an imaging condition, and thus can easily obtain a stereoscopic image that is stereoscopically and comfortably viewable.

These and other objects, features, aspects and advantages of the present invention will become more apparent from the following detailed description of the present invention when taken in conjunction with the accompanying drawings.

DESCRIPTION OF THE PREFERRED EMBODIMENTS (Imaging Device/Camera)

Figure 1:
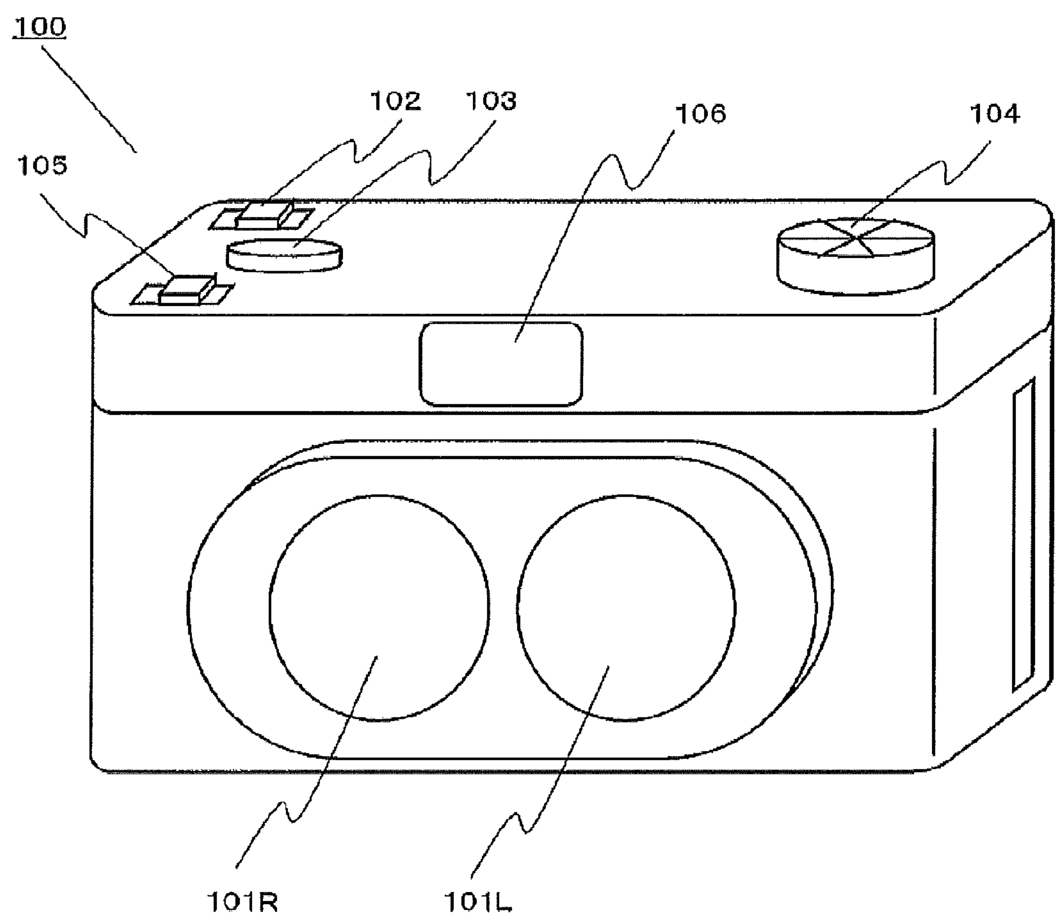
FIG. 1 is an external view of a camera that includes a stereoscopic imaging optical system of the present invention.

FIG. 1 is an external view of a camera according to an embodiment of the present invention.

The camera 100 shown in FIG. 1 includes two imaging lens systems 101R (on the right side when facing an object) and 101L (on the left side when facing an object), a stereo base adjustment lever 102, a shutter button 103, a mode change switch 104, a zoom lever 105, and a strobe 106.

The camera 100 takes two images that are formed by the two imaging lens systems 101R and 101L and that have a parallax in the horizontal direction. It should be noted that the camera 100 is also capable of taking a 2D image with only either one of the two imaging lens systems 101R and 101L.

The mode change switch 104 changes a shooting mode between 2D shooting and 3D shooting and between moving image shooting and still image shooting. The shutter button 103 is an input device for instructing to take an image. In a still image shooting mode, when the shutter button 103 is pressed, a still image is taken. In a moving image shooting mode, the shutter button 103 serves as a recording ON/OFF switch. Specifically, in the moving image shooting mode, when the shutter button 103 is pressed, recording a moving image is started, and then, when the shutter button 103 is pressed again, the recording stops. The zoom lever 105 instructs to change the focal lengths of the two imaging lens systems 101R and 101L. The strobe 106 is used for illuminating a dark object when an image of the dark object is taken.

The stereo base adjustment lever 102 can be slid to move diaphragms of the imaging lens systems 101R and 101L. By so doing, it is possible to finely adjust a stereo base when a stereoscopic image is taken. In addition, as described below, when the imaging lens systems 101R and 101L are configured to be movable in directions perpendicular to the optical axes thereof, it suffices that one or both of the imaging lens systems 101R and 101L are moved in accordance with an operation of the stereo base adjustment lever 102. In this case, the imaging lens systems 101R and 101L may be moved simultaneously with the diaphragms or may be moved independently of the diaphragms.

Figure 2:
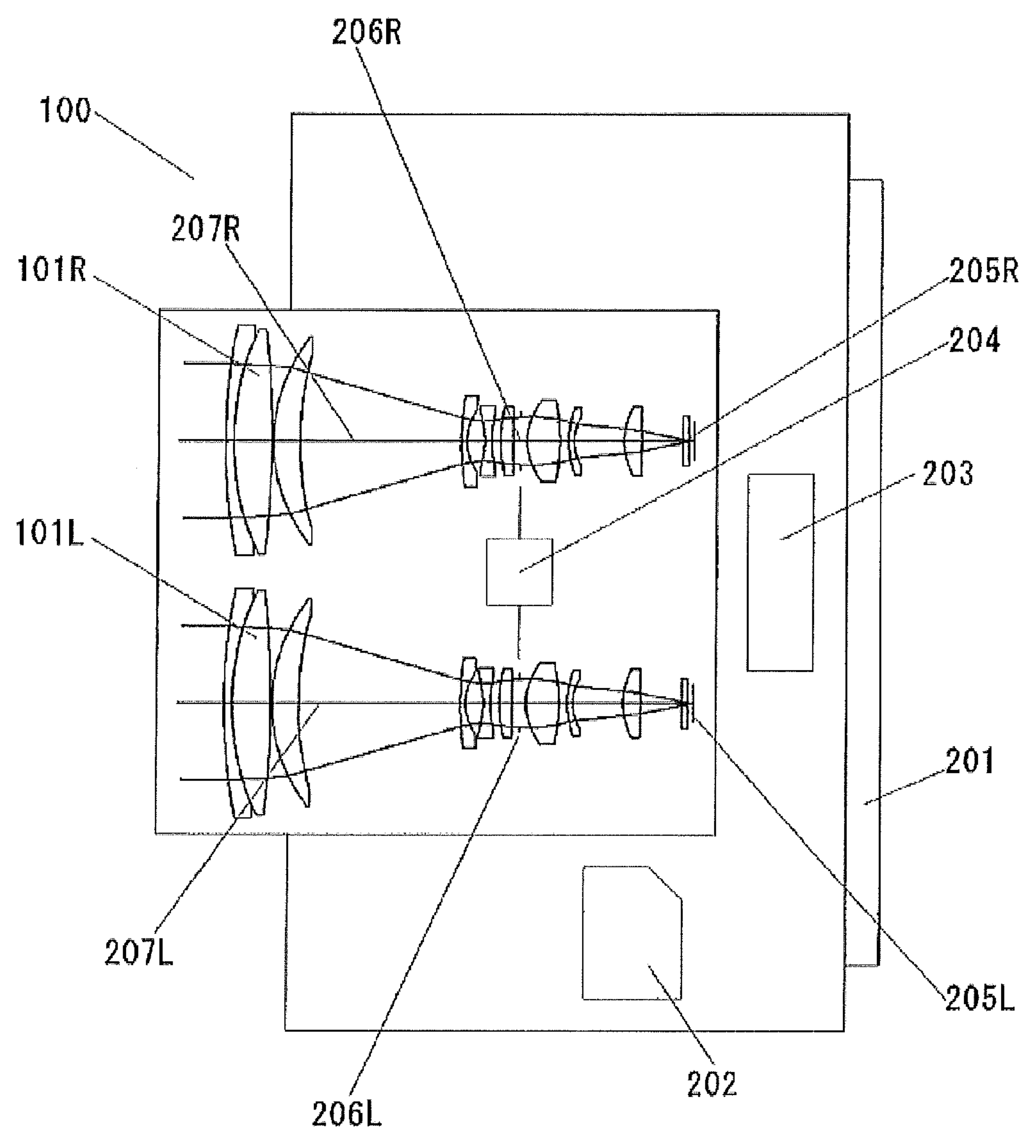
FIG. 2 is a cross-sectional view of the camera that includes the stereoscopic imaging optical system of the present invention.

FIG. 2 is a cross-sectional view of the camera according to the embodiment of the present invention.

The camera 100 includes the imaging lens systems 101R and 101L arranged in parallel, a liquid crystal screen 201 for displaying image signals, a memory 202 for recording image signals, a stereo base calculation section 203 for calculating a stereo base, and a diaphragm position drive section 204. The imaging lens system 101R includes a plurality of lens elements and a diaphragm 206R. Similarly, the imaging lens system 101L includes a plurality of lens elements and a diaphragm 206L. In addition, the camera 100 includes image sensors 205R and 205L corresponding to the imaging lens systems 101R and 101L, respectively.

The imaging lens systems 101R and 101L have the same lens configurations and are arranged in parallel such that optical axes 207L and 207R thereof are parallel to each other. The definition of the optical axes 207 will be described below.

The diaphragm position drive section 204 is capable of decentering the diaphragms 206R and 206L with respect to the optical axes 207L and 207R of the imaging lens systems 101R and 101L.

In a state where the shutter button 103 is pressed half, the stereo base calculation section 203 calculates a parallax amount from images obtained by the two imaging lens systems 101R and 101L, calculates a stereo base that provides an appropriate stereoscopic effect, on the basis of the parallax amount, and transmits information to the diaphragm position drive section 204. The diaphragm position drive section 204 adjusts the stereo base by decentering the aperture positions of the diaphragms 206R and 206L from the positions of the optical axes 207L and 207R of the two imaging lens systems 101R and 101L, respectively, such that the stereo base becomes appropriate.

Then, when the shutter is pressed, a stereoscopic image that provides a preferable stereoscopic effect can easily be taken. Due to this camera configuration, a photographer does not need to pay attention to stereo base adjustment, and a camera in which the stereo base is automatically adjusted is realized.

In the above description, automatic adjustment of the stereo base is performed when a shutter button operation is performed. However, a photographer may instruct the camera to adjust the stereo base, such as by operating the stereo base adjustment lever 102.

Further, the imaging lens systems 101R and 101L have the same lens configurations, but are not limited thereto and may have different lens configurations.

(Diaphragm Unit)

Figure 3:
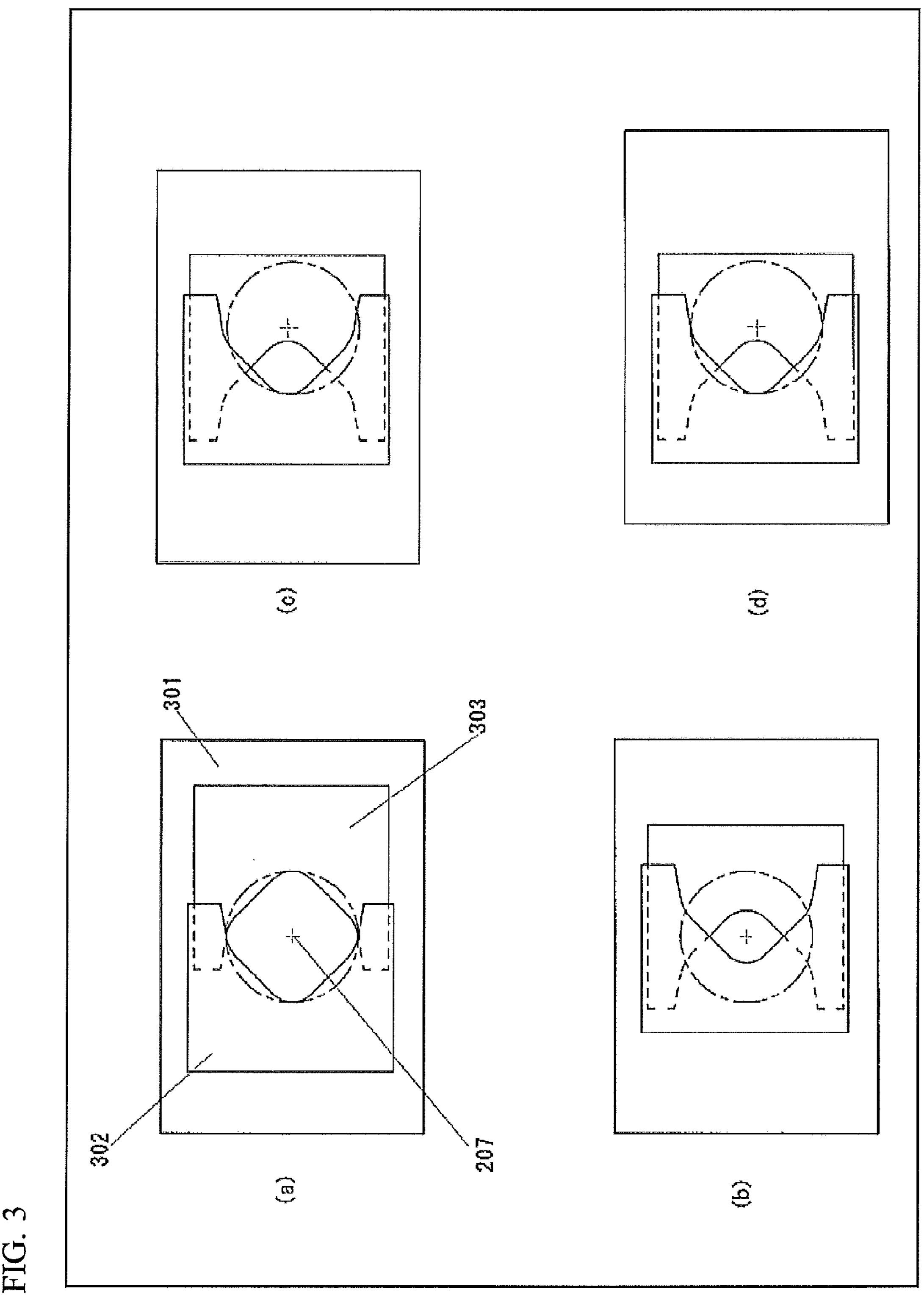
FIG. 3 is schematic configuration diagrams of a diaphragm of the present invention.

FIG. 3 illustrates schematic configuration diagrams of the diaphragm mounted in the stereoscopic imaging optical system.

The diaphragm includes a frame 301, a first blade 302, and a second blade 303. The frame 301, the first blade 302, and the second blade 303 can be decentered with respect to the optical axis 207 of the imaging lens system by the diaphragm position drive section 204.

FIG. 3(*a*) illustrates a state where the diaphragm is not decentered with respect to the optical axis 207 of the imaging lens system and the first blade 302 and the second blade 303 are opened.

FIG. 3(*b*) illustrates a state where the diaphragm is not decentered with respect to the optical axis 207 of the imaging lens system and the first blade 302 and the second blade 303 are moved such that an aperture is narrowed.

FIG. 3(*c*) illustrates a state where the first blade 302 and the second blade 303 are moved such that an aperture is narrowed and the entire frame 301 is decentered with respect to the optical axis 207 of the imaging lens system to decenter the diaphragm.

FIG. 3(*d*) illustrates a state where the first blade 302 and the second blade 303 are decentered further from the state in FIG. 3(*b*) so as to be asymmetrical to each other with respect to the frame.

In the present embodiment, the case of the two blades is described. However, the present invention is not limited thereto, and obviously, the same operation is possible with three or more blades.

A digital still camera that is capable of taking a stereoscopic image and in which the stereo base is variable can be provided by using a stereoscopic imaging optical system according to each of Embodiments 1 to 4 described below in a digital still camera.

(Embodiment 1)

Figure 4:
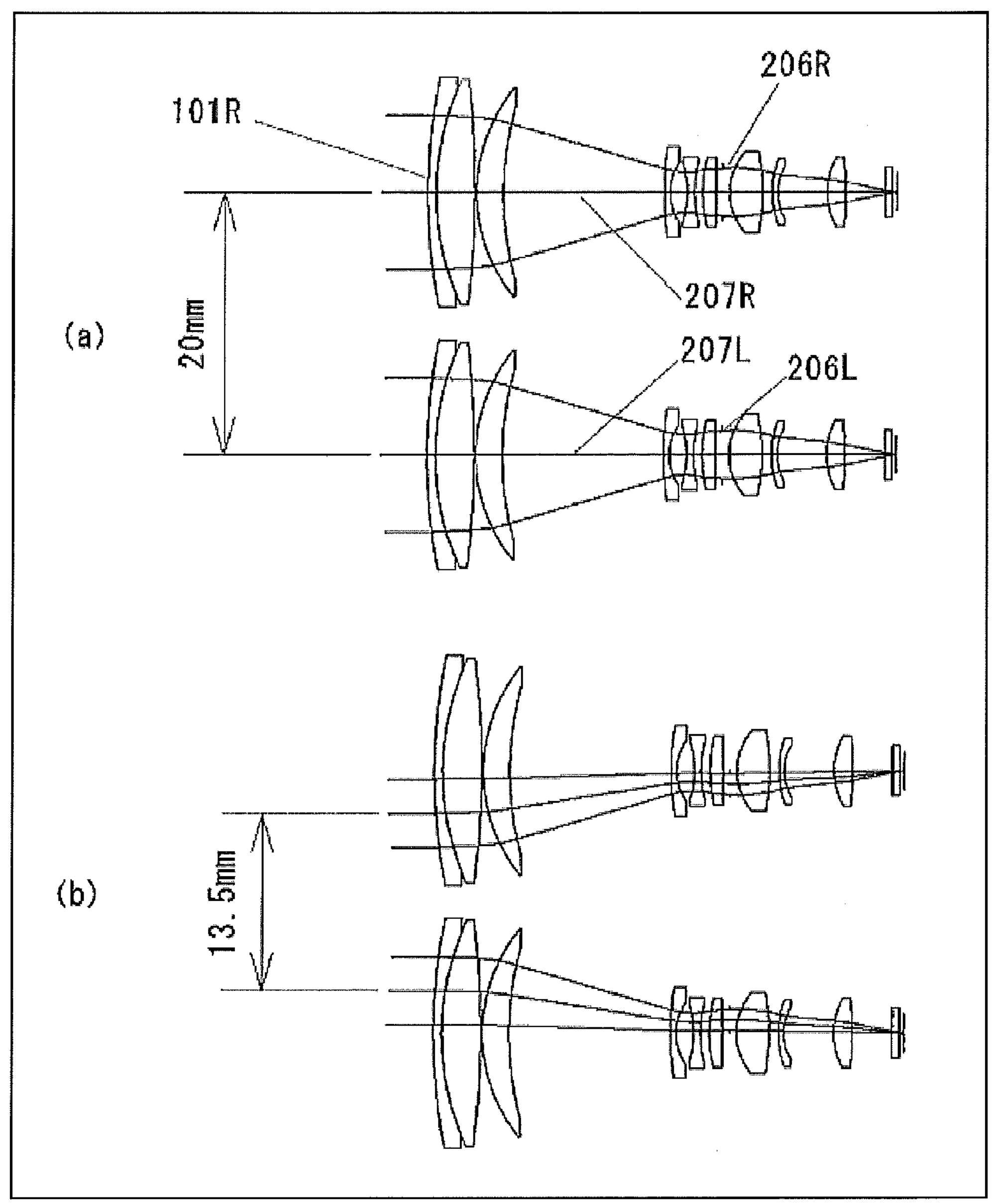
FIG. 4 is lens arrangement diagrams illustrating a stereoscopic imaging optical system according to Embodiment 1 (Numerical Example 1)

FIG. 4 is lens arrangement diagrams illustrating a stereoscopic imaging optical system according to Embodiment 1 of the present invention. The imaging lens systems 101R and 101L have the same lens configurations and are arranged in parallel such that the optical axes 207R and 207L thereof are parallel to each other. In addition, the imaging lens systems 101R and 101L include the diaphragms 206R and 206L, respectively.

Each of the imaging lens systems 101R and 101L according to Embodiment 1 is a fixed-length zoom optical system whose overall length does not change at the time of zooming from a wide-angle limit to a telephoto limit when an image is taken. FIGS. 4(*a*) and 4(*b*) illustrate optical path diagrams at the telephoto limit when the two imaging lens systems are arranged at an interval of 20 mm. In Embodiment 1, the diaphragms 206R and 206L are configured to be able to be driven to be decentered.

In the present specification, the interval between the two imaging lens systems is defined as the interval between the centers of lenses on the object side. In addition, the stereo base is defined as the interval, on surfaces of the lenses closest to the object side, between principal beams of light beams with which the two imaging lens systems form images at the centers of the corresponding image sensors. The principal beam is defined as a light beam passing through the center between an upper beam and a lower beam of a light beam. The optical axis is defined as the principal beam of a light beam that forms an image at the center of the image sensor when the diaphragm is opened.

FIG. 4(*a*) is an optical path diagram when the diaphragms 206R and 206L are not decentered with respect to the imaging lens systems. FIG. 4(*b*) is an optical path diagram when each of the diaphragms 206R and 206L is decentered from the state in FIG. 4(*a*) by 1 mm in a direction in which the interval is decreased, without changing the positions of the imaging lens systems. The stereo base is changed to 13.5 mm by decentering the diaphragms 206R and 206L with respect to the optical axes 207R and 207L of the imaging lens systems 101R and 101L.

(Embodiment 2)

Figure 5:
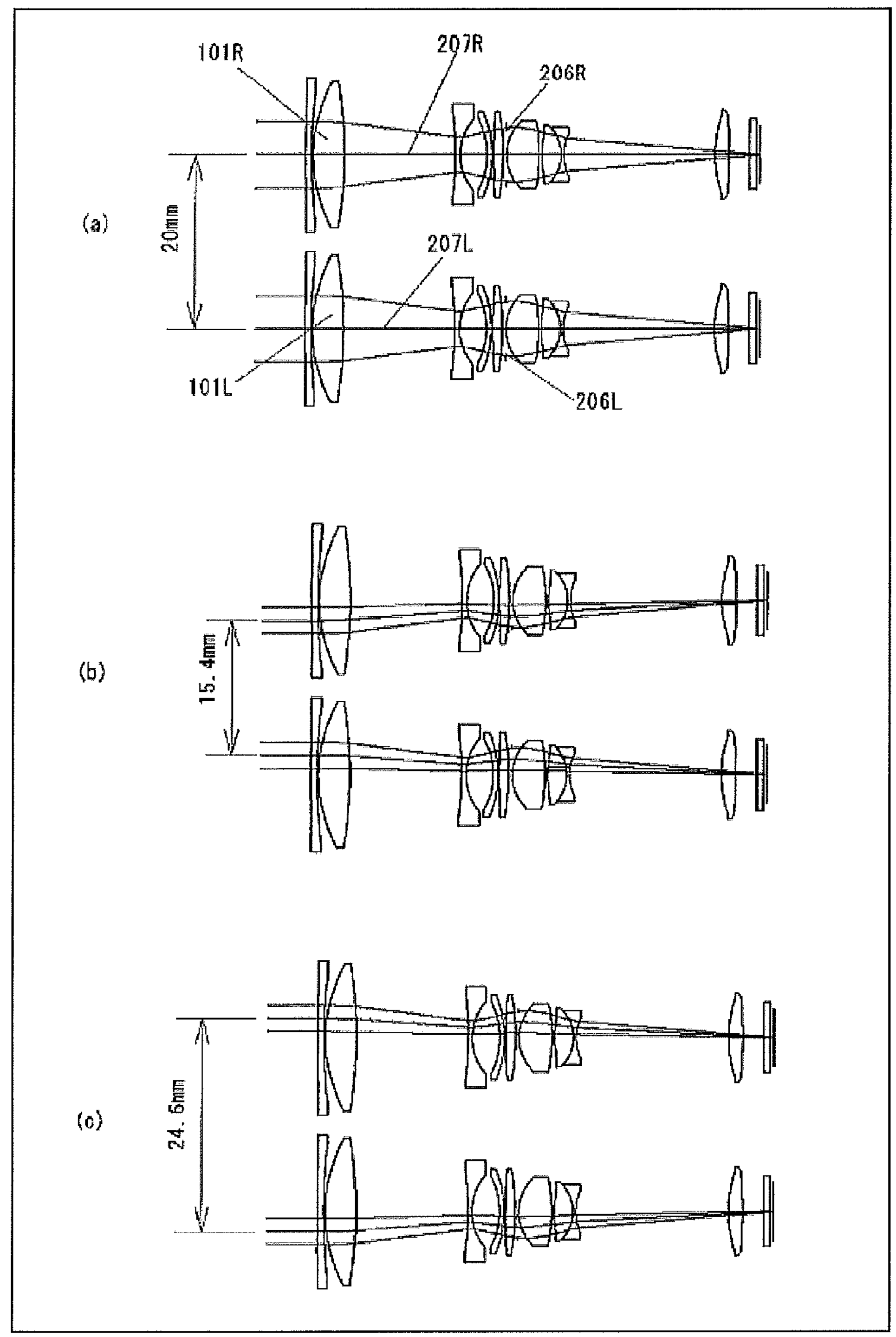
FIG. 5 is lens arrangement diagrams illustrating a stereoscopic imaging optical system according to Embodiment 2 (Numerical Example 2)

FIG. 5 is lens arrangement diagrams illustrating a stereoscopic imaging optical system according to Embodiment 2 of the present invention. The imaging lens systems 101R and 101L have the same lens configurations and are arranged in parallel such that the optical axes 207R and 207L thereof are parallel to each other. In addition, the imaging lens systems 101R and 101L include the diaphragms 206R and 206L, respectively.

Each of the imaging lens systems 101R and 101L according to Embodiment 2 is a zoom optical system whose overall length is variable at the time of zooming from the wide-angle limit to the telephoto limit when an image is taken. FIGS. 5(*a*) to 5(*c*) illustrate optical path diagrams at the telephoto limit when the imaging lens systems are arranged at an interval of 20 mm. In Embodiment 2, the diaphragms 206R and 206L are configured to be able to be driven to be decentered.

FIG. 5(*a*) is an optical path diagram when the diaphragms 206R and 206L are not decentered with respect to the imaging lens systems. FIG. 5(*b*) is an optical path diagram when each of the two diaphragms 206R and 206L is decentered from the state in FIG. 5(*a*) by 1.8 mm in the direction in which the interval is decreased, without changing the positions of the imaging lens systems. The stereo base is changed to 15.4 mm by decentering the diaphragms 206R and 206L. FIG. 5(*c*) is an optical path diagram when each of the two diaphragms 206R and 206L is decentered from the state in FIG. 5(*a*) by 1.8 mm in a direction in which the interval is increased, without changing the positions of the lenses. The stereo base is changed to 24.6 mm by decentering the diaphragms 206R and 206L with respect to the optical axes 207R and 207L of the imaging lens systems 101R and 101L.

(Embodiment 3)

Figure 6:
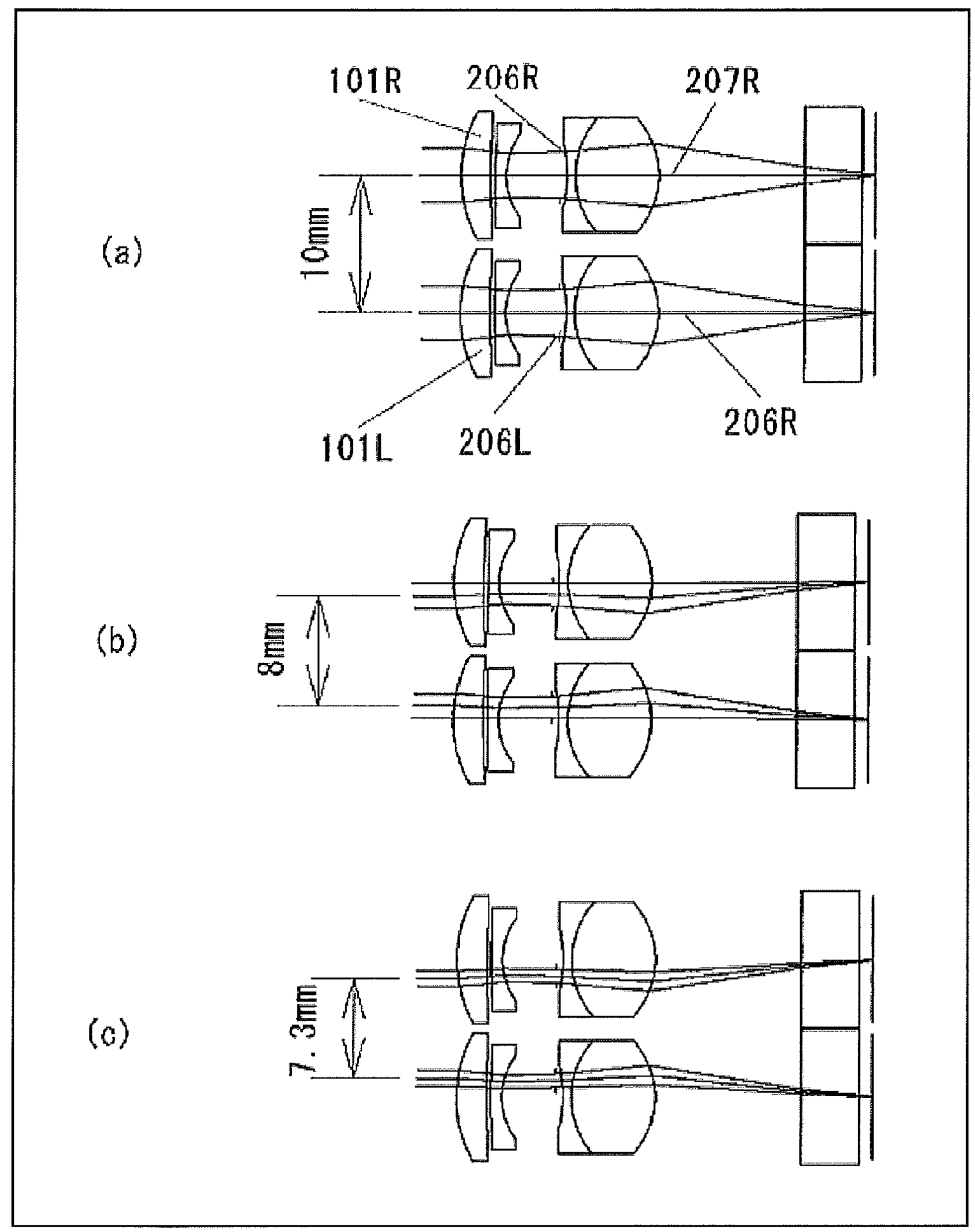
FIG. 6 is lens arrangement diagrams illustrating a stereoscopic imaging optical system according to Embodiment 3 (Numerical Example 3)

FIG. 6 is lens arrangement diagrams illustrating a stereoscopic imaging optical system according to Embodiment 3 of the present invention. The imaging lens systems 101R and 101L have the same lens configurations and are arranged in parallel such that the optical axes 207R and 207L thereof are parallel to each other. In addition, the imaging lens systems 101R and 101L include the diaphragms 206R and 206L, respectively.

Each of the imaging lens systems 101R and 101L according to Embodiment 3 is a single-focus optical system. FIGS. 6(*a*) to 6(*c*) are optical path diagrams when the imaging lens systems are arranged at an interval of 10 mm. In Embodiment 3, the diaphragms 206R and 206L are configured to be able to be driven to be decentered.

FIG. 6(*a*) is an optical path diagram when the diaphragms 206R and 206L are not decentered with respect to the imaging lens systems. FIG. 6(*b*) is an optical path diagram when, from the state in FIG. 6(*a*), the F-number is changed to F6.8 and each of the two diaphragms 206R and 206L is decentered by 0.9 mm in the direction in which the interval is decreased, without changing the positions of the imaging lens systems. FIG. 6(*c*) is an optical path diagram when, from the state in FIG. 6(*a*), the F-number is changed to F10.95 and each of the two diaphragms 206R and 206L is decentered by 1.2 mm in the direction in which the interval is decreased, without changing the positions of the imaging lens systems. The change amount of the stereo base can be increased by increasing the F-number and increasing the decentering amount as described above.

(Embodiment 4)

Figure 7:
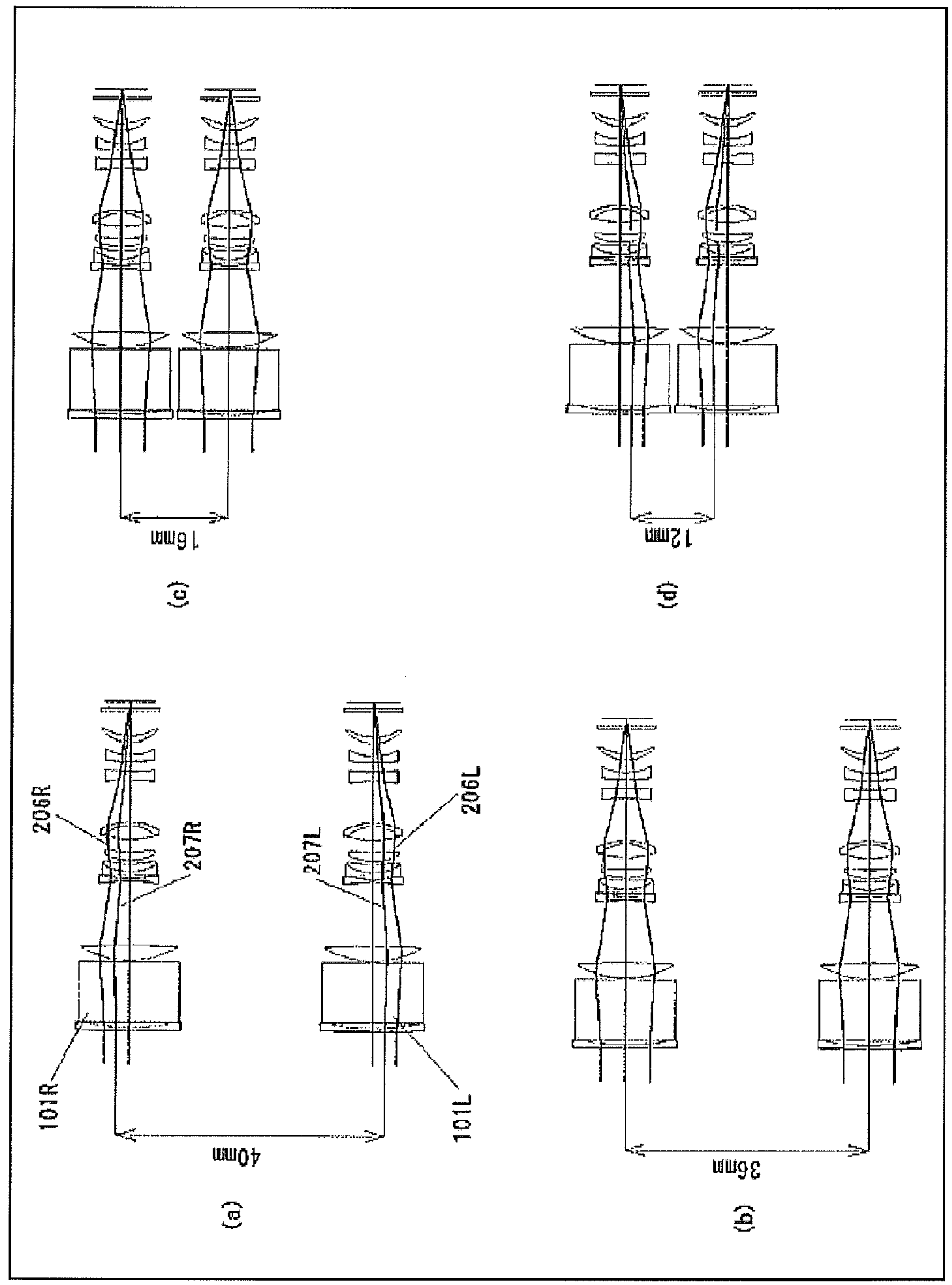
FIG. 7 is lens arrangement diagrams illustrating a stereoscopic imaging optical system according to Embodiment 4 (Numerical Example 4).

FIG. 7 is lens arrangement diagrams illustrating a stereoscopic imaging optical system according to Embodiment 4 of the present invention. The imaging lens systems 101R and 101L have the same lens configurations and are arranged in parallel such that the optical axes 207R and 207L thereof are parallel to each other. In addition, the imaging lens systems 101R and 101L include the diaphragms 206R and 206L, respectively.

Each of the imaging lens systems 101R and 101L according to Embodiment 4 is a fixed-length zoom optical system that includes a prism for bending an optical path and whose overall length does not change at the time of zooming from the wide-angle limit to the telephoto limit when an image is taken. In Embodiment 4, the diaphragms 206R and 206L are configured to be able to be driven to be decentered, and, in addition, the entire imaging lens systems 101R and 101L are configured to be moveable in directions perpendicular to the optical axes thereof.

FIG. 7(*a*) is an optical path diagram in a state where the stereo base is increased by decentering the diaphragms 206R and 206L when the interval between the imaging lens systems is the maximum. FIGS. 7(*b*) and 7(*c*) are each an optical path diagram when the interval between the imaging lens systems is the maximum or the minimum and in a state where the diaphragms 206R and 206L are not decentered with respect to the lenses. FIG. 7(*d*) is an optical path diagram in a state where the stereo base is decreased by decentering the diaphragms 206R and 206L when the interval between the imaging lens systems is the minimum.

The movement amount of the entire imaging lens systems is 20 mm. In the case where only the imaging lens systems are moved, the stereo base is 36 mm at a maximum (FIG. 7(*b*)) and is 16 mm at a minimum (FIG. 7(*c*)). In addition, the change amount of the stereo base caused by decentering the diaphragms by 1.5 mm is 4 mm. Thus, the stereo base can be 40 mm in the case of FIG. 7(*a*) and can be 12 mm in the case of FIG. 7(*d*).

Thus, the range in which the stereo base is variable is widened, and hence a distance range of an object in which an appropriate stereoscopic effect can be obtained is widened.

In each of the stereoscopic imaging optical systems according to Embodiments 1 to 4, the stereo base can continuously be changed by appropriately changing the decentering amounts of the diaphragms.

Each of the stereoscopic imaging optical systems according to Embodiments 1 to 4 may include, in addition to the imaging lens systems and the diaphragms, a diaphragm position drive section for changing the positions of the diaphragms.

It should be noted that any of the stereoscopic imaging optical systems according to Embodiments 1 to 4 may be used in the digital still camera shown in FIG. 2. In addition, the stereoscopic imaging optical system of the digital still camera shown in FIG. 2 can also be used in a digital video camera intended to take a moving image. In this case, in addition to a still image, a moving image having high resolution can be taken.

Hereinafter, conditions that are preferably satisfied by the stereoscopic imaging optical systems according to Embodiments 1 to 4 will be described. A plurality of preferable conditions are set forth for the stereoscopic imaging optical system according to each embodiment, and a configuration of a stereoscopic imaging optical system that satisfies all these conditions is most preferable. However, when an individual condition is satisfied, a zoom lens system having the corresponding effect can be obtained.

For example, each of the stereoscopic imaging optical systems according to Embodiments 1 to 4 preferably satisfies the following condition (1).

$$1.8 \leq SB_{max}/(fT \times \tan(\omega T)) \leq 45 \quad (1)$$

where $SB_{max}$ is the maximum value of the stereo base, fT is a focal length of the optical system at the telephoto limit, and ωT is a half view angle (°) at the telephoto limit.

The condition (1) defines the relation between the maximum value of the stereo base and the focal length at the telephoto limit and the half view angle at the telephoto limit. When the value obtained by the formula in the condition (1) decreases to be less than the lower limit of the condition (1), a 3D image that provides a desired stereoscopic effect cannot be obtained when an image of a person is taken. On the other hand, when the value increases to exceed the upper limit of the condition (1), the stereo base becomes too broad, and thus the overall size of the camera becomes too large.

It should be noted that when at least one of the following conditions (1)' and (1)" is satisfied, the above effect can be exerted greatly.

$$3.0 \leq SB_{max}/(fT \times \tan(\omega T)) \quad (1)'$$

$$SB_{max}/(fT \times \tan(\omega T)) \leq 30 \quad (1)''$$

It should be noted that when at least one of the following conditions (1)''' and (1)'''' is satisfied, the above effect can be exerted still more greatly.

$$4.5 \leq SB_{max}/(fT \times \tan(\omega T)) \quad (1)'''$$

$$SB_{max}/(fT \times \tan(\omega T)) \leq 20 \quad (1)''''$$

Each of the stereoscopic imaging optical systems according to Embodiments 1 to 4 preferably satisfies the following conditions (2) and (3).

$$\Delta SBw/\Delta SBt \leq 1 \quad (2)$$

$$\Delta SBt/SB_{max} > 0.08 \quad (3)$$

where

ΔSBw is the absolute value of a change amount of the stereo base caused by diaphragm movement at the wide-angle limit, ΔSBt is the absolute value of a change amount of the stereo base caused by the diaphragm movement at the telephoto limit, and $SB_{max}$ is the maximum value of the stereo base.

The condition (2) defines the relation between the absolute value of the change amount of the stereo base caused by the diaphragm movement at the wide-angle limit of the stereoscopic imaging optical system and the absolute value of the change amount of the stereo base caused by the diaphragm movement at the telephoto limit of the stereoscopic imaging optical system. The condition (3) defines the relation between the absolute value of the change amount of the stereo base caused by the diaphragm movement at the telephoto limit and the maximum value of the stereo base. When the conditions (2) and (3) are satisfied, a superior stereoscopic effect corresponding to the view angle can be adjusted.

The parallax is increased at the telephoto limit to be greater than that at the wide-angle limit and is recorded in an image. Thus, in order to adjust the parallax based on an adjustment of the stereo base, the change amount of the stereo base is preferably greater at the telephoto limit than at the wide-angle limit as set forth in the condition (2). In addition, when an image of a close object is taken, the parallax amount becomes great and an image excessively projects. Thus, an uncomfortable feeling is provided to a viewer. When the value obtained by the formula in the condition (3) decreases to be less than the lower limit of the condition (3), the range in which the parallax is adjustable becomes small, and thus the effect of suppressing excessive projection of an image cannot sufficiently be obtained.

It should be noted that when the following condition (2)' is further satisfied, the above effect can be exerted greatly.

$$\Delta SBw/\Delta SBt < 0.33 \quad (2)'$$

It should be noted that when the following condition (2)" is further satisfied, the above effect can be exerted still more greatly.

$$\Delta SBw/\Delta SBt<0.25 \quad (2)''$$

In each of the stereoscopic imaging optical systems according to Embodiments 1 to 4, at least one diaphragm can be moved in a direction that is perpendicular to the optical axis of the imaging lens system and that is parallel to a plane that includes the optical axes of the two imaging lens systems arranged in parallel. Therefore, the movement amount of the diaphragm with respect to the change amount of the stereo base is suppressed, and the size of the barrel can be reduced.

In each of the stereoscopic imaging optical systems according to Embodiments 1 to 4, when the interval between the optical axes of the two imaging lens systems arranged in parallel is variable, the range in which the stereo base is variable can be widened, and thus the object distance range in which an image is taken with an appropriate stereoscopic effect can be widened further.

In each of the stereoscopic imaging optical systems according to Embodiments 1 to 4, at least one diaphragm can be moved such that the stereo base is less than the minimum value of the interval between the optical axes of the two imaging lens systems arranged in parallel. Thus, an image of a close object can be taken with an appropriate stereoscopic effect.

In each of the stereoscopic imaging optical systems according to Embodiments 1 to 4, at least one diaphragm can be moved such that the stereo base is greater than the maximum value of the interval between the optical axes of the optical axes of the two imaging lens systems arranged in parallel. Thus, the stereoscopic effect of a farther object is improved.

Further, for the stereoscopic imaging optical system according to the present invention, for example, an imaging lens system having a so-called collapsible structure may be used instead of the imaging lens systems shown in Embodiments 1 to 4. Alternatively, an imaging lens system of a so-called sliding barrel, in which a part of a lens group or lens elements constituting the imaging lens system is moved from the optical axis when collapsing, may be used.

Moreover, an imaging device that includes any of the above-described stereoscopic imaging optical systems according to Embodiments 1 to 4 and an image sensor such as CCD or CMOS is also applicable to a mobile telephone, a surveillance camera in a surveillance system, a Web camera, a vehicle-mounted camera, or the like. When a gradient of an illumination distribution occurs in the diaphragm decentering direction, a method is also considered in which the illumination distribution is corrected separately (asymmetrically) on the right and left sides.

EXAMPLES

Numerical examples are described below, in which the stereoscopic imaging optical systems according to Embodiments 1 to 4 are implemented. In each numerical example, the units of length in the tables are all "mm", and the units of view angle are all "○". Moreover, in each numerical example, r is the radius of curvature, d is the axial distance, nd is the refractive index to the d-line, and vd is the Abbe number to the d-line. In each numerical example, the surfaces marked with "*" are aspheric surfaces, and the aspheric surface configuration is defined by the following formula.

$$Z = \frac{h^2/r}{1+\sqrt{1-(1+\kappa)(h/r)^2}} + \sum A_n h^n$$

where

Z is the distance from a point on an aspheric surface at a height h relative to the optical axis to a tangential plane at the vertex of the aspheric surface, h is the height relative to the optical axis, r is the radius of curvature at the top, κ is the conic constant, and $A_n$ is the n-th order aspheric coefficient.

With regard to the signs of the diaphragm decentering amount and the change amount of the stereo base caused by diaphragm decentering, the direction in which the stereo base is decreased is defined as minus.

Numerical Example 1

A stereoscopic imaging optical system of Numerical Example 1 corresponds to Embodiment 1 shown in FIG. 4. Table 1 shows the surface data of the stereoscopic imaging optical system of Numerical Example 1, Table 2 shows the aspherical data thereof, Table 3 shows the various data thereof, and Table 4 shows the stereo base data thereof

TABLE 1

(Surface data)
Surface data

| Surface number | r | d | nd | vd |
|---|---|---|---|---|
| Object surface | ∞ | | | |
| 1 | 46.06590 | 0.61000 | 1.92286 | 20.9 |
| 2 | 20.52670 | 3.00000 | 1.69680 | 55.5 |
| 3 | −71.19790 | 0.10000 | | |
| 4 | 12.70290 | 2.00000 | 1.72916 | 54.7 |
| 5 | 24.22800 | Variable | | |
| 6 | 24.22800 | 0.40000 | 1.49306 | 80.8 |
| 7 | 3.97950 | 1.35000 | | |
| 8* | −7.28210 | 0.50000 | 1.85135 | 40.1 |
| 9* | 8.02000 | 0.66300 | | |
| 10 | 11.33970 | 1.00000 | 1.94595 | 18.0 |
| 11 | −143.69900 | Variable | | |
| 12(Diaphragm) | ∞ | 0.50000 | | |
| 13* | 4.32230 | 2.50000 | 1.60602 | 57.4 |
| 14* | −12.80700 | 0.69000 | | |
| 15 | 7.15770 | 0.40000 | 1.94595 | 18.0 |
| 16 | 3.67000 | Variable | | |
| 17* | 5.18070 | 1.35000 | 1.51835 | 70.3 |
| 18 | −49.45100 | Variable | | |
| 19 | ∞ | 0.50000 | 1.51680 | 64.2 |
| 20 | ∞ | 0.37000 | | |
| 21 | ∞ | BF | | |
| Image surface | ∞ | | | |

TABLE 2

(Aspherical data)

| Surface No. | Parameters |
|---|---|
| 8 | K = −6.72000E+00, A4 = −3.48417E−03, A6 = 3.16937E−04, A8 = −7.03550E−06 |
| 9 | K = −6.72000E+00, A4 = 4.80960E−05, A6 = 1.76141E−04, A8 = 0.00000E+00 |
| 13 | K = −1.09000E+00, A4 = 1.94760E−04, A6 = 7.01422E−06, A8 = −5.80881E−07 |

TABLE 2-continued

| (Aspherical data) | |
|---|---|
| Surface No. | Parameters |
| 14 | K = 1.89000E+00, A4 = 1.15409E−03, A6 = −2.77558E−05, A8 = 0.00000E+00 |
| 17 | K = −1.50000E+00, A4 = 9.61776E−04, A6 = −3.34242E−05, A8 = −2.15916E−06 |

TABLE 3

| (Various data) Zooming ratio 9.65676 | | | |
|---|---|---|---|
| | Wide | Middle | Telephoto |
| Focal length | 3.0347 | 12.1822 | 29.3057 |
| F-number | 1.86510 | 2.31315 | 2.50037 |
| View angle | 28.6448 | 7.0952 | 2.9262 |
| Image height | 1.5160 | 1.5160 | 1.5160 |
| Overall length of lens system | 35.6156 | 35.6306 | 35.6389 |
| BF | −0.01158 | 0.00339 | 0.01174 |
| d5 | 0.5000 | 8.8620 | 12.2589 |
| d11 | 12.2589 | 3.8968 | 0.5000 |
| d16 | 3.4455 | 1.6346 | 3.8029 |
| d18 | 3.4898 | 5.3008 | 3.1324 |

TABLE 4

| (Stereo base data) | | | | |
|---|---|---|---|---|
| | Wide-angle limit | | Telephoto limit | |
| Interval of lens systems | 20.0 | 20.0 | 20.0 | 20.0 |
| F-number | 1.86 | 5.62 | 2.50 | 5.64 |
| Decentering amount | 0.0 | −1.0 | 0.0 | −1.0 |
| Change amount of stereo base due to decentering of diaphragms | 0.0 | −0.7 | 0.0 | −6.5 |
| Stereo base | 20.0 | 19.3 | 20.0 | 13.5 |

Numerical Example 2

A stereoscopic imaging optical system of Numerical Example 2 corresponds to Embodiment 2 shown in FIG. 5. Table 5 shows the surface data of the stereoscopic imaging optical system of Numerical Example 2, Table 6 shows the aspherical data thereof, Table 7 shows the various data thereof, and Table 8 shows the stereo base data thereof.

TABLE 5

| (Surface data) | | | | |
|---|---|---|---|---|
| Surface number | r | d | nd | vd |
| Object surface | ∞ | | | |
| 1 | 397.54520 | 0.70000 | 2.00272 | 19.3 |
| 2 | 70.22760 | 0.15000 | | |
| 3* | 17.18750 | 3.50000 | 1.58332 | 59.1 |
| 4* | −50.95470 | Variable | | |
| 5* | −44.64090 | 0.50000 | 1.84973 | 40.6 |
| 6* | 5.87890 | 3.17170 | | |
| 7 | −8.61680 | 0.50000 | 1.80470 | 41.0 |
| 8* | −13.93450 | 0.15000 | | |
| 9 | 61.22400 | 1.13480 | 2.00272 | 19.3 |
| 10 | −26.71530 | Variable | | |
| 11(Diaphragm) | ∞ | 0.10000 | | |
| 12* | 5.22530 | 3.80000 | 1.54541 | 67.3 |

TABLE 5-continued

| (Surface data) | | | | |
|---|---|---|---|---|
| Surface number | r | d | nd | vd |
| 13* | −21.31750 | 0.29230 | | |
| 14* | 12.30520 | 2.19090 | 1.82302 | 44.4 |
| 15 | −4.58930 | 0.30000 | 1.86306 | 32.2 |
| 16 | 5.34390 | Variable | | |
| 17* | 14.99140 | 1.58480 | 1.58332 | 59.1 |
| 18* | −59.23900 | Variable | | |
| 19 | ∞ | 0.78000 | 1.51680 | 64.2 |
| 20 | ∞ | 0.37000 | | |
| 21 | ∞ | BF | | |
| Image surface | ∞ | | | |

TABLE 6

| (Aspherical data) | |
|---|---|
| Surface No. | Parameters |
| 3 | K = 0.00000E+00, A4 = −3.04772E−05, A6 = 0.00000E+00, A8 = 0.00000E+00, A10 = 0.00000E+00, A12 = 0.00000E+00, A14 = 0.00000E+00, A16 = 0.00000E+00 |
| 4 | K = 0.00000E+00, A4 = −4.33743E−06, A6 = 1.43625E−07, A8 = 6.93626E−10, A10 = −3.30761E−11, A12 = −2.09418E−13, A14 = 1.50665E−14, A16 = −1.28346E−16 |
| 5 | K = 0.00000E+00, A4 = −1.20167E−04, A6 = 9.79203E−06, A8 = −2.99132E−07, A10 = 2.72302E−09, A12 = 0.00000E+00, A14 = 0.00000E+00, A16 = 0.00000E+00 |
| 6 | K = 0.00000E+00, A4 = −4.40908E−04, A6 = −5.84805E−06, A8 = 1.36916E−06, A10 = −5.92952E−08, A12 = 0.00000E+00, A14 = 0.00000E+00, A16 = 0.00000E+00 |
| 8 | K = 0.00000E+00, A4 = −8.28305E−05, A6 = −2.82436E−06, A8 = −5.71474E−08, A10 = 0.00000E+00, A12 = 0.00000E+00, A14 = 0.00000E+00, A16 = 0.00000E+00 |
| 12 | K = −8.94821E−02, A4 = −1.03225E−04, A6 = −3.72448E−07, A8 = 1.79677E−07, A10 = −2.19691E−08, A12 = 0.00000E+00, A14 = 0.00000E+00, A16 = 0.00000E+00 |
| 13 | K = 0.00000E+00, A4 = 3.76470E−04, A6 = −1.45382E−05, A8 = −3.43014E−06, A10 = 1.36999E−07, A12 = 0.00000E+00, A14 = 0.00000E+00, A16 = 0.00000E+00 |
| 14 | K = 0.00000E+00, A4 = −8.25065E−04, A6 = −4.17989E−05, A8 = −4.91949E−06, A10 = 0.00000E+00, A12 = 0.00000E+00, A14 = 0.00000E+00, A16 = 0.00000E+00 |
| 17 | K = 0.00000E+00, A4 = 1.21630E−03, A6 = −1.66912E−04, A8 = 1.01499E−05, A10 = −2.50992E−07, A12 = 9.34704E−10, A14 = 0.00000E+00, A16 = 0.00000E+00 |
| 18 | K = 0.00000E+00, A4 = 1.66898E−03, A6 = −2.42600E−04, A8 = 1.40857E−05, A10 = −3.31456E−07, A12 = 1.14559E−09, A14 = 0.00000E+00, A16 = 0.00000E+00 |

TABLE 7

| (Various data) Zooming ratio 6.99168 | | | |
|---|---|---|---|
| | Wide | Middle | Telephoto |
| Focal length | 5.1606 | 14.2136 | 36.0812 |
| F-number | 2.90355 | 4.10461 | 4.70017 |
| View angle | 40.7564 | 14.9580 | 6.0553 |
| Image height | 3.6700 | 3.8700 | 3.8700 |
| Overall length of lens system | 45.3152 | 47.4432 | 52.0685 |
| BF | 0.02673 | 0.02385 | 0.05011 |
| d4 | 0.4942 | 7.9168 | 12.6669 |
| d10 | 17.4154 | 7.2164 | 0.3000 |
| d16 | 4.8891 | 10.0369 | 17.4270 |
| d18 | 3.2653 | 3.0248 | 2.4000 |

TABLE 8

| (Stereo base data) | | | | | | |
|---|---|---|---|---|---|---|
| | Wide-angle limit | | | Telephoto limit | | |
| Interval of lens systems | 20.0 | 20.0 | 20.0 | 20.0 | 20.0 | 20.0 |
| F-number | 2.9 | 7.57 | 7.57 | 4.7 | 11.86 | 11.86 |
| Decentering amount | 0.0 | −1.0 | 1.0 | 0.0 | −1.8 | 1.8 |
| Change amount of stereo base due to decentering of diaphragms | 0.0 | −0.7 | 0.7 | 0.0 | −4.6 | 4.6 |
| Stereo base | 20.0 | 19.3 | 20.7 | 20.0 | 15.4 | 24.6 |

Numerical Example 3

A stereoscopic imaging optical system of Numerical Example 3 corresponds to Embodiment 3 shown in FIG. 6. Table 9 shows the surface data of the stereoscopic imaging optical system of Numerical Example 3, Table 10 shows the aspherical data thereof, Table 11 shows the various data thereof, and Table 12 shows the stereo base data thereof. For a fixed focal length lens, the formulas of the present invention are applied with fT=f where its focal length is f, and with ΔSBw=ΔSBt=ΔSB where the change amount of the stereo base caused by diaphragm movement is ΔSB.

TABLE 9

| (Surface data) | | | | |
|---|---|---|---|---|
| Surface number | r | d | nd | vd |
| Object surface | ∞ | | | |
| 1* | 9.52270 | 2.20000 | 1.82750 | 30.3 |
| 2 | 78.67260 | 0.30000 | | |
| 3 | 171.97800 | 0.80000 | 1.56493 | 43.1 |
| 4 | 5.00000 | 3.91000 | | |
| 5(Diaphragm) | ∞ | 0.50000 | | |
| 6* | −12.75210 | 0.60000 | 1.77819 | 25.8 |
| 7 | 6.09380 | 6.03300 | 1.79140 | 47.6 |
| 8* | −6.16400 | 10.43400 | | |
| 9 | ∞ | 4.20000 | 1.51680 | 64.2 |
| 10 | ∞ | 1.00000 | | |
| 11 | ∞ | BF | | |
| Variable | ∞ | | | |

TABLE 10

| (Aspherical data) | |
|---|---|
| Surface No. | Parameters |
| 1 | K = 0.00000E+00, A4 = 7.25909E−06, A6 = 5.44199E−07, A8 = −5.66749E−10 |
| 6 | K = 0.00000E+00, A4 = −1.57977E−03, A6 = −7.14301E−05, A8 = −4.29782E−06 |
| 8 | K = 0.00000E+00, A4 = 7.46013E−05, A6 = −5.85231E−07, A8 = 5.81409E−08 |

TABLE 11

| (Various data) | |
|---|---|
| Focal length | 12.5170 |
| F-number | 3.24377 |
| View angle | 22.5720 |

TABLE 11-continued

| (Various data) | |
|---|---|
| Image height | 5.0000 |
| Overall length of lens system | 29.9914 |
| BF | 0.01443 |

TABLE 12

| (Stereo base data) | | | | | | |
|---|---|---|---|---|---|---|
| | Wide-angle limit | | | Telephoto limit | | |
| Interval of lens systems | 10.0 | 10.0 | 10.0 | 10.0 | 10.0 | 10.0 |
| F-number | 3.23 | 6.85 | 10.95 | 3.23 | 6.85 | 10.95 |
| Decentering amount | 0.0 | −0.9 | −1.2 | 0.0 | −0.9 | −1.2 |
| Change amount of stereo base due to decentering of diaphragms | 0.0 | −2.0 | −2.7 | 0.0 | −2.0 | −2.7 |
| Stereo base | 10.0 | 8.0 | 7.3 | 10.0 | 8.0 | 7.3 |

Numerical Example 4

A stereoscopic imaging optical system of Numerical Example 4 corresponds to Embodiment 4 shown in FIG. 7. Table 13 shows the surface data of the stereoscopic imaging optical system of Numerical Example 4, Table 14 shows the aspherical data thereof, Table 15 shows the various data thereof, and Table 16 shows the stereo base data thereof.

TABLE 13

| (Surface data) | | | | |
|---|---|---|---|---|
| Surface number | r | d | nd | vd |
| Object surface | ∞ | | | |
| 1 | 387.21360 | 0.49500 | 1.92286 | 20.9 |
| 2 | 27.81070 | 0.75170 | | |
| 3 | ∞ | 8.99000 | 1.90366 | 31.3 |
| 4 | ∞ | 0.25000 | | |
| 5* | 13.52820 | 2.30700 | 1.69350 | 53.2 |
| 6* | −62.04010 | Variable | | |
| 7* | −22.71180 | 0.45900 | 1.86400 | 40.6 |
| 8* | 15.08460 | 0.57000 | | |
| 9 | −72.22610 | 0.41000 | 1.88300 | 40.8 |
| 10 | 6.76700 | 1.28490 | 1.94595 | 18.0 |
| 11 | 18.16000 | Variable | | |
| 12* | 8.28490 | 1.34000 | 1.58313 | 59.5 |
| 13* | 59.35340 | 0.50000 | | |
| 14(Diaphragm) | ∞ | Variable | | |
| 15* | 11.66800 | 2.06430 | 1.62262 | 58.2 |
| 16 | −5.66650 | 0.39200 | 1.80518 | 25.5 |
| 17 | −10.15950 | Variable | | |
| 18 | −40.42150 | 1.36260 | 1.84666 | 23.8 |
| 19 | 40.42150 | 1.36670 | | |
| 20* | 131.42260 | 1.00000 | 1.52996 | 55.8 |
| 21* | 9.04210 | 1.91000 | | |
| 22* | 5.18210 | 1.00000 | 1.58313 | 59.5 |
| 23 | 7.67560 | 3.67000 | | |
| 24 | ∞ | 0.50000 | 1.51680 | 64.2 |
| 25 | ∞ | 0.99000 | | |
| 26 | ∞ | BF | | |
| Image surface | ∞ | | | |

TABLE 14

| (Aspherical data) | |
|---|---|
| Surface No. | Parameters |
| 5 | K = 0.00000E+00, A4 = −3.08030E−05, A6 = 7.89795E−07, A8 = −3.65115E−09, A10 = −1.00059E−10 |
| 6 | K = 0.00000E+00, A4 = 2.37721E−05, A6 = 1.21316E−06, A8 = −1.71059E−08, A10 = 2.01720E−11 |
| 7 | K = 0.00000E+00, A4 = 8.93503E−04, A6 = −3.78202E−05, A8 = 2.64081E−07, A10 = 3.24794E−08 |
| 8 | K = 0.00000E+00, A4 = 7.31531E−04, A6 = −1.79591E−06, A8 = −3.67304E−06, A10 = 2.06739E−07 |
| 12 | K = 0.00000E+00, A4 = −2.76245E−04, A6 = 6.36008E−05, A8 = −4.65579E−06, A10 = 2.26975E−07 |
| 13 | K = 0.00000E+00, A4 = 5.15529E−05, A6 = 5.92025E−05, A8 = −3.74298E−06, A10 = 2.03181E−07 |
| 15 | K = 0.00000E+00, A4 = −3.85036E−04, A6 = 3.77635E−06, A8 = −1.91902E−08, A10 = −3.60381E−09 |
| 20 | K = 0.00000E+00, A4 = 1.63333E−03, A6 = 4.48215E−06, A8 = −3.40363E−06, A10 = 8.41806E−09 |
| 21 | K = 0.00000E+00, A4 = 1.65005E−03, A6 = 7.61212E−05, A8 = −1.01974E−06, A10 = −3.66504E−07 |
| 22 | K = 0.00000E+00, A4 = −7.30864E−04, A6 = 3.06568E−05, A8 = −2.44701E−07, A10 = −4.61571E−08 |

TABLE 15

| (Various data) Zooming ratio 3.72034 | | | |
|---|---|---|---|
| | Wide | Middle | Telephoto |
| Focal length | 6.4373 | 12.4176 | 23.9488 |
| F-number | 3.29850 | 3.30008 | 3.30020 |
| View angle | 34.1974 | 17.0791 | 8.6464 |
| Image height | 3.6000 | 3.6000 | 3.6000 |
| Overall length of lens system | 48.9094 | 48.9635 | 48.9530 |
| BF | −0.01204 | 0.04225 | 0.03158 |
| d6 | 0.5000 | 5.7305 | 9.3227 |
| d11 | 9.3227 | 4.0921 | 0.5000 |
| d14 | 5.4855 | 3.6214 | 1.2400 |
| d17 | 2.0000 | 3.8641 | 6.2455 |

TABLE 16

| (Stereo base data) | Wide-angle limit | | | | Telephoto limit | | | |
|---|---|---|---|---|---|---|---|---|
| Interval of lens systems | 36.0 | 36.0 | 16.0 | 16.0 | 36.0 | 36.0 | 16.0 | 16.0 |
| F-number | 6.5 | 3.3 | 3.3 | 6.5 | 6.8 | 3.3 | 3.3 | 6.8 |
| Decentering amount | 1.2 | 0.0 | 0.0 | −1.2 | 1.5 | 0.0 | 0.0 | −1.5 |
| Change amount of stereo base due to decentering of diaphragms | 0.96 | 0.0 | 0.0 | −0.96 | 4.0 | 0.0 | 0.0 | −4.0 |
| Stereo base | 36.9 | 36.0 | 16.0 | 15.1 | 40.0 | 36.0 | 16.0 | 12.0 |

The following Table 17 shows values corresponding to the individual conditions in the stereoscopic imaging optical system of each numerical example.

TABLE 17

| (Corresponding values to individual conditions) | Numerical Example 1 | Numerical Example 2 | Numerical Example 3 | Numerical Example 4 |
|---|---|---|---|---|
| fW | 3.03 | 5.16 | 12.52 | 6.43 |
| fT | 29.31 | 36.08 | 12.52 | 23.92 |
| ωT | 2.93 | 6.06 | 22.57 | 9.10 |
| $SB_{max}$ | 20.0 | 24.6 | 10.0 | 40.0 |
| ΔSBw | 0.7 | 0.7 | 2.7 | 1.0 |
| ΔSBt | 6.5 | 4.6 | 2.7 | 4.0 |
| $SB_{max}/(fT \times \tan(\omega T))$ | 13.35 | 6.43 | 1.92 | 10.44 |
| $\Delta SBw/SB_{max}$ | 0.33 | 0.19 | 0.27 | 0.10 |
| ΔSBt/ΔSBt | 0.11 | 0.15 | 1.00 | 0.24 |

The stereoscopic imaging optical system according to the present invention is applicable to digital input devices such as a digital camera, a mobile telephone, a surveillance camera in a surveillance system, a Web camera, and a vehicle-mounted camera, and in particular, is suitable for an imaging optical system of a digital camera or the like which is required to take a high-quality stereoscopic image.

While the invention has been described in detail, the foregoing description is in all aspects illustrative and not restrictive. It will be understood that numerous other modifications and variations can be devised without departing from the scope of the invention.

What is claimed is:

1. A stereoscopic imaging optical system that forms optical images of an object and that is available for taking a stereoscopic image, the stereoscopic imaging optical system comprising:

two imaging lens systems arranged in parallel; and two diaphragms arranged in the two imaging lens systems, respectively, wherein at least one of the diaphragms is decentered with respect to an optical axis to adjust a stereo base, and the following condition (1) is satisfied:

$$1.8 \le SB_{max}/(fT \times \tan(\omega T)) \le 45 \quad (1)$$

where $SB_{max}$ is a maximum value of the stereo base, fT is a focal length of the optical system at a telephoto limit, and ωT is a half view angle (○) at the telephoto limit.

2. The stereoscopic imaging optical system according to claim 1, wherein the following conditions (2) and (3) are satisfied:

$$\Delta SBw/\Delta SBt \le 1 \quad (2)$$

$$\Delta SBt/SB_{max} > 0.08 \quad (3)$$

where

ΔSBw is the absolute value of a change amount of the stereo base caused by diaphragm movement at a wide-angle limit, ΔSBt is the absolute value of a change amount of the stereo base caused by the diaphragm movement at the telephoto limit, and $SB_{max}$ is the maximum value of the stereo base.

3. The stereoscopic imaging optical system according to claim 1, wherein the at least one of the diaphragms is moved in a direction that is perpendicular to the optical axis of the imaging lens system and that is parallel to a plane that includes the optical axes of the two imaging lens systems.

4. The stereoscopic imaging optical system according to claim 1, wherein an interval between the optical axes of the two imaging lens systems arranged in parallel is variable.

5. The stereoscopic imaging optical system according to claim 4, wherein the at least one of the diaphragms is moved such that the stereo base is less than a minimum value of the interval between the optical axes of the two imaging lens systems arranged in parallel.

6. The stereoscopic imaging optical system according to claim 4, wherein the at least one of the diaphragms is moved such that the stereo base is greater than a maximum value of the interval between the optical axes of the two imaging lens systems arranged in parallel.

7. The stereoscopic imaging optical system according to claim 1, further comprising a diaphragm position drive mechanism for moving positions of the diaphragms.

8. An imaging device capable of outputting an optical image of an object as an electrical image signal, the imaging device comprising:

a stereoscopic imaging optical system according to claim 1 for forming optical images of an object; and an image sensor for converting the optical images formed by the stereoscopic imaging optical system into electrical image signals.

9. The imaging device according to claim 8, further comprising:

a calculation section for calculating parallax information from images obtained from the imaging lens systems arranged in parallel, and calculating an optimum stereo base on the basis of the parallax information;

a diaphragm position drive mechanism for moving positions of the diaphragms; and a control section for controlling the diaphragm position drive mechanism, wherein the control section controls the positions of the diaphragms through the diaphragm position drive mechanism on the basis of the optimum stereo base calculated by the calculation section.

10. A camera for converting an optical image of an object into an electrical image signal and at least displaying or storing the converted image signal, the camera comprising:

an imaging device including: a stereoscopic imaging optical system according to claim 1 for forming optical images of an object; and an image sensor for converting the optical images formed by the stereoscopic imaging optical system into electrical image signals.

* * * * *